United States Patent

[11] 3,622,214

[72] Inventor  Hans Durr
               Schweinfurt am Main, Germany
[21] Appl. No. 881,541
[22] Filed     Dec. 2, 1969
[45] Patented  Nov. 23, 1971
[73] Assignee  Fichtel & Sachs AG
               Schweinfurt am Main, Germany
[32] Priority  Dec. 17, 1968
[33]           Germany
[31]           P 18 15 037.3

[54] BEARING ARRANGEMENT AND METHOD OF MAKING THE SAME
     7 Claims, 1 Drawing Fig.
[52] U.S. Cl. .................................................. 308/179
[51] Int. Cl. ................................................. F16c 3/12
[50] Field of Search ........................................ 308/178, 179; 74/595

[56]              References Cited
                UNITED STATES PATENTS
     553,400    1/1896   Field ............................ 84/595
                   FOREIGN PATENTS
     153,049   10/1920   Great Britain ................ 308/179
     718,359   11/1931   France .......................... 308/179
     959,773    2/1957   Germany ...................... 308/179

Primary Examiner—Martin P. Schwadron
Assistant Examiner—Frank Susko
Attorney—Kelman & Berman ABSTRACT: A connecting rod bearing assembly mainly consisting of a journal member having conically tapering ends fixedly received in conforming bores of respective crank webs and a cylindrical middle portion carrying the bearing ring of the connecting rod. Flat abutment rings are held in area contact with the opposite faces of the webs by a press fit on the journal member. The device is assembled by simultaneously pressing the two abutment rings and the webs from the ends of the journal member toward the middle portion.

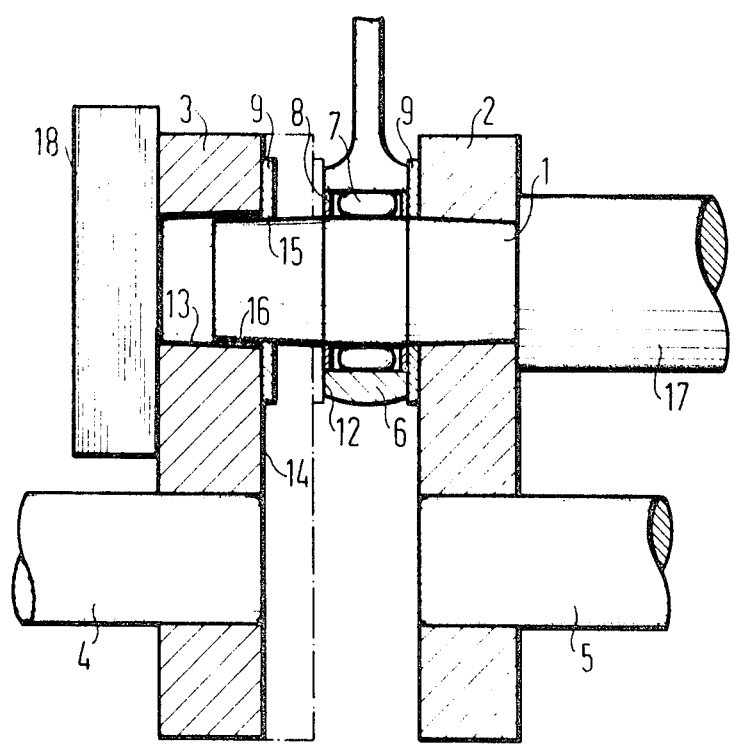

BEARING ARRANGEMENT AND METHOD OF MAKING THE SAME

This invention relates to bearing arrangements in which a journal member extends at right angles to a face of a support, and a flat, annular abutment member is provided for protecting the face of the support and for other purposes, and particularly to a connecting rod bearing on the crankshaft of an internal combustion engine having a reciprocating piston.

It has been common practice heretofore to provide the crank webs with annular abutment discs coaxially mounted on the connecting rod journal on both sides of the bearing ring. The conventional discs are loosely mounted on the journal so that they can rotate freely. It has been found that such discs tend to fail under the stresses to which they are subjected during engine operation, particularly when the crankshaft rotates rapidly.

It has therefore been proposed in German utility model No. 1,925,039 to secure the abutment discs against rotation on the connecting rod journal of the crankshaft by fixedly fastening the discs to the crank webs. This arrangement has been successful in extending the useful life of the discs, but the methods available for securing the discs to the crank webs are relatively costly and inconvenient.

The primary object of the invention is the provision of a bearing arrangement of the type described with flat annular abutment members between the bearing ring of the connecting rod and crank webs, the abutment members being secured against rotation about the journal axis, but the bearing arrangement being capable of being assembled in a simple and inexpensive manner.

In its more specific application to a connecting rod bearing, the invention provides a journal member fixedly connecting respective opposite faces of two crank webs which are spaced from each other. The axis of the journal member is perpendicular to each of the faces. An annular bearing member on the connecting rod is coaxially rotatable on the journal member. Two flat annular abutment members are coaxially arranged on the journal member between the bearing member and the two faces of the crank webs respectively. Each abutment member is secured by a press fit on the journal member against displacement and in area contact with a respective one of the crank web faces.

Other features, additional objects, and many of the attendant advantages of this invention will readily become apparent from the following detailed description of a preferred embodiment when considered in connection with the appended drawing in which the sole FIGURE shows a partly assembled connecting rod bearing arrangement of an internal combustion engine and apparatus for assembling the bearing arrangement in side elevation, and partly in section on the bearing axis.

Only as much of the otherwise conventional crankshaft and of associated elements is shown in the drawing as is needed for an understanding of the invention. The illustrated elements of the crankshaft are a connecting rod journal 1, the two crank webs 2,3 which are fixedly connected by the journal 1 in the fully assembled condition of the bearing arrangement, and two main bearing journals 4,5 on the webs 3,2 respectively. The annular bearing head 6 of the connecting rod envelops bearing needles 7 retained in a cage 8.

Two flat, annular abutment discs 9 are coaxially mounted on the journal 1 between radial faces 12 of the bearing head 6 and corresponding faces 14 of the crank webs 2,3. The axially terminal end portions of the journal 1 have conically tapering faces 16 and are received in bores of the crank webs 2,3 having correspondingly tapering inner walls 13, the walls 13 and faces 16 tapering axially in a direction away from each other and from the cylindrical middle portion of the journal 1.

The two crank webs 2,3 are clamped between the ram 17 and the anvil 18 of a press, not otherwise shown and conventional in itself. For the convenience of pictorial representation, one of the terminal portions of the journal 1 is shown in a press fit engagement with the inner wall of the associated bore in the crank web 2, whereas the other terminal journal portion is only partly received in the tapering bore of the crank web 3, and the associated abutment member 9 is shown in a position in which the diameter of its inner cylindrical face 15 matches the outer diameter of the conical face 16 on the journal member 1. When the ram 17 and the anvil 18 press the crank webs 2,3 further toward each other, the journal 1 is ultimately secured in the web 3 by a press fit as illustrated with respect to the web 2, and the abutment disc 9 adjacent the web 3 is secured on the journal 1 in a similar manner.

The apparatus illustrated is made of steel except for the abutment discs 9 which are preferably made from cold-worked bronze, although some other nonferrous metals have desirable frictional properties in contact with steel and a combination of high tensile strength and toughness approaching the corresponding properties of cold-worked bronze. The initial internal diameter of the abutment discs 9 should be smaller than the diameter of the cylindrical middle portion of the journal 1 by about 1.5 percent to 3 percent, based on the cylindrical journal diameter in order to provide the desired firm press fit of the discs 9 on the journal 1.

The condition illustrated in the drawing does not usually occur during assembly of the illustrated arrangement. Depending on the nature of the connecting rod head 6, the head and the bearing in the same may be slipped first over the journal 1. Thereafter, the two tapering terminal portions of the journal are inserted in the central openings of the discs 9, and ultimately, the terminal journal portions are inserted in the bores of the two crank webs 2,3. At this stage, the preassembled webs 2,3 are arranged between the ram 17 and the anvil 18, substantially as shown in the drawing, and are pressed against each other, whereby both discs 9 are simultaneously driven toward the cylindrical middle portion of the journal in full area contact with the webs 2,3 and precisely coaxial with the journal 1. The apex angles of the tapering faces 16 and walls 13 should be similar, but need not be precisely identical, as is well known, to secure the desired firm press fit of the journal 1 in the webs 2,3. If a connecting rod having a split bearing ring is employed, the bearing ring may be installed on the journal 1 at any stage of the assembly process.

The connecting rod bearing arrangements of the invention are thus assembled in a simple manner from elements of simple configuration. Yet, these bearing arrangements have been found to be reliable and to have a long useful life. The discs 9 are not damaged even during high-speed operation of the associated engine over extended periods of time, and they precisely locate the connecting rod on the crankshaft. It is believed that the desirable operating characteristics of the bearing arrangement is due to a substantial part to the close area contact between the discs 9 and the crank webs 2,3 which permits frictionally generated heat to be transmitted quickly from the thin discs to the heavy crank webs. The discs do not tend to work themselves loose on the journal 1.

I claim:

1. A bearing arrangement for a connecting rod on a crankshaft including:
 a. two crank webs having respective opposite faces spaced from each other;
 b. a journal member fixedly connecting said faces and having an axis perpendicular to each of said faces,
  1. said webs being formed with respective coaxial bores,
  2. each bore tapering in an axial direction away from the other bore,
  3. said journal member having respective terminal portions conformingly received in said bores and secured in said bores by a press fit;
 c. an annular bearing member for said connecting rod coaxially rotatable on said journal member; and
 d. two flat annular abutment members coaxially arranged on said journal member between said bearing member and said faces respectively,
  1. each abutment member being fixedly secured by a press fit on said journal member and in area contact with a respective one of said faces.

2. An arrangement as set forth in claim 1, wherein said journal member has an axially central cylindrical portion carrying said bearing member, said terminal portions tapering conically from said central portion and respectively carrying said abutment members.

3. An arrangement as set forth in claim 1, wherein said abutment members consist of nonferrous metal, and said journal member consists of ferrous metal.

4. An arrangement as set forth in claim 1, wherein said bores and said terminal portions taper conically.

5. An arrangement as set forth in claim 2, wherein said abutment members essentially consist of cold-worked bronze.

6. A method of assembling a connecting rod bearing which comprises:
   a. coaxially installing a bearing ring on a journal member having a cylindrical axial portion and two terminal portions tapering in opposite axial directions from said cylindrical portion;
   b. coaxially inserting said terminal portions in respective central openings of two annular, flat abutment members, said openings having an initial internal diameter smaller than the diameter of said cylindrical portion;
   c. thereafter coaxially inserting said terminal portions in respective bores of two crank webs, said bores tapering axially at approximately the same apex angles as the inserted terminal portions of said journal member; and
   d. pressing said crank webs toward each other until said abutment rings are secured against displacement on said journal member, and said journal member is secured against displacement in said bores.

7. A method as set forth in claim 6, wherein said abutment members essentially consist of nonferrous metal and the initial internal diameter of each abutment member is smaller by 1.5 percent to 3 percent than the diameter of said cylindrical portion.

* * * * *